United States Patent [19]

Rhoads

[11] 4,070,513

[45] Jan. 24, 1978

[54] HEAT SEAL APPARATUS AND SEAMED SLEEVE ARTICLE MADE THEREBY

[75] Inventor: Roger R. Rhoads, Toledo, Ohio

[73] Assignee: Owens-Illinois, Inc., Toledo, Ohio

[21] Appl. No.: 724,675

[22] Filed: Sept. 20, 1976

[51] Int. Cl.² .......................... B32B 3/00; B65D 11/16
[52] U.S. Cl. ........................................ 428/36; 156/290;
 156/581; 215/12 R; 428/57; 428/157; 428/195
[58] Field of Search .................. 156/581, 290; 428/36,
 428/57, 157, 195

[56] References Cited

U.S. PATENT DOCUMENTS

| | | | |
|---|---|---|---|
| 3,013,930 | 12/1961 | Serbin | 156/581 |
| 3,017,315 | 1/1962 | Doyle | 156/581 |
| 3,258,385 | 6/1966 | Lake | 156/581 |
| 3,914,152 | 10/1975 | Amberg et al. | 156/446 |

*Primary Examiner*—William R. Dixon, Jr.
*Attorney, Agent, or Firm*—John R. Nelson

[57] ABSTRACT

The disclosure relates to an improved seal bar used with a mandrel-turret machine for winding a sheet blank of heat shrinkable plastic in end overlapping relationship and sealing the overlapped ends by heat and pressure as a side seam of a sleeve. The seal bar includes plural rows of islands disposed along the heated nose surface through its length, the islands consisting of either raised portions or indented portions. The islands interrupt the heated sealing surface providing a series of hot and relatively colder spots. This prevents burning failures in the seam and permits a wider latitude of operating temperatures for the sealing mechanism.

There is also a new and novel seamed sleeve of heat shrinkable polymer of the foamed or foam/film type, the seam having corresponding islands appearing as outer surface variations along the seal-seam area corresponding with the placement of the islands on the seal bar nose surface used in making the seam.

2 Claims, 7 Drawing Figures

HEAT SEAL APPARATUS AND SEAMED SLEEVE ARTICLE MADE THEREBY

The present invention relates to apparatus for heat sealing pieces of thermoplastic material together. More particularly, the invention provides a heat seal bar device used in sealing overlapped marginal end portions of plastic foam or film blanks to form a novel tubular, axially seamed sleeve.

BACKGROUND OF THE INVENTION

In the manufacture of seamed, tubular sleeves of a heat shrinkable thermoplastic, such as a foamed polymer material, a web of such material is sized in width and cut repeatedly into discrete lengths or blanks. These blanks are picked up by a cylindrical mandrel and wound thereon such that the trailing edge overlaps the leading edge. As the edges overlap, a heat sealing device is pressed against the two-ply region of the wound blank to fusion weld or heat seal the two marginal edges together.

The sleeve formed by such procedure is axially transferred over a container, such as a glass bottle, and subjected to heat sufficient to shrink the sleeve in place in conforming relationship on the outer surface of the container. This form of glass container and printed shrunken sleeve cover is in popular use today.

The cycle just described is disclosed in U.S. Pat. No. 3,914,152 issued to S. A. Amberg, et al, wherein the heat sealing device includes an elongated sealing bar including an arcuate face or nose extending axially of the sleeve on the mandrel. The sealing bar is supported on a radius of the turret carrying the mandrel extending through the mandrel center axis. The mechanism supporting the sealing bar moves from a retracted position on a heater to the extended position whereat the bar face engages the overlapped plastic to apply heat and pressure, thereby sealing or seaming the axial extent of the portions of material in this overlap. The heat shrinkable polymeric material of the sleeve is sensitive to heat in that the heat sealing temperature of the seal bar should be maintained within limits; otherwise, the "seams" may be partially burned or otherwise improperly made such that in use the sleeve seams open up during or after shrinking the sleeve onto the container.

SUMMARY OF THE INVENTION

The present invention includes an improved seal bar structure for use in the production process just described which improves the reliability and quality of the overlapped seam of the sleeve so that split or ruptured seams are not a problem.

The invention employs a seal bar which includes a face or nose surface having physical characteristics of construction and function that impart to the overlapped plies of the polymer material a series of hot and relatively colder spots along the extent of the seam.

This improved structure further enables the heater on the mandrel turret machine to function in a wider temperature range, i.e., the limits of temperature in seal bar operation are not as confined or sensitive, without imparing efficiency or quality of the manufacture of the sleeves in production.

More specifically, the objectives of the invention are achieved by designing the contour of the bar face or nose (the surface thereof actually pressed against the two-ply plastic) to include a pattern of milled indentations along the length thereof. Or, as in a second embodiment of the invention, the seal bar nose surface is provided with a pattern of raised areas or islands. Either from varies transmission of the heat applied to the overlapped polymer plies to produce the hot and relatively colder spots in welding the seam.

The invention also produces a more reliable seamed sleeve product of a heat shrinkable thermoplastic polymeric material of either film or foam variety by utilizing the variation of the heat transfer points of the invention. This produces a seam in the plastic overlap in which discontinuous portions or islands of the plastic plies are fused into each other and the areas in between absorb any excess heat from the ironing seal bar. The resultant seam is an intermittent, discontinuous fusion of portions of the overlapped plies of material together to form the seam joining the two together.

DESCRIPTION OF THE INVENTION

Figure 1:
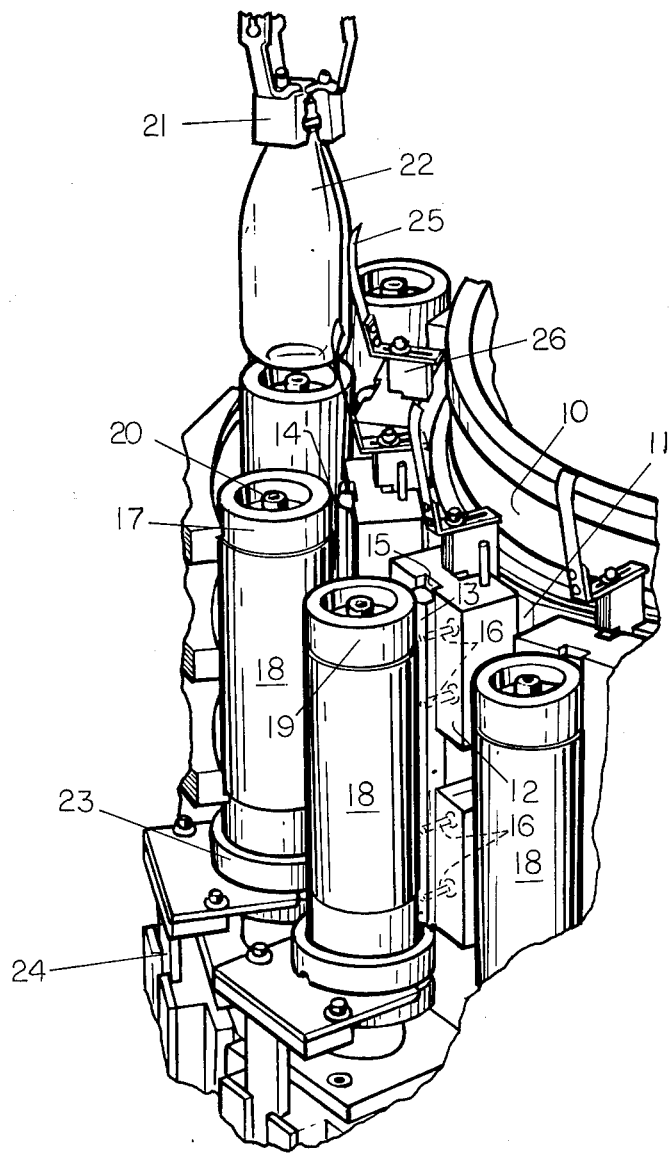
FIG. 1 is a partial, perspective view of the mandrel-turret machine on which axially seamed sleeves of the polymer material are made utilizing the present invention.

Referring to FIG. 1, the mandrel-turret machine is shown in part as the setting for utilizing the invention. This mandrel-turret machine is more particularly described in U.S. Pat. No. 3,914,152. Briefly described, the machine includes a circular turret 10 which revolves about a vertical center shaft at predetermined speed of rotation. On the turret there is included ring-shaped heat sink 11 connected to electrically powered resistance heater units which maintain the heat sink 11 at a predetermined, elevated temperature. Spaced about the heater 11 are the plural sealing bar holders 12 which are mounted on extensible cam-operated rods (not shown) which normally maintain each of the holders 12 in firm, heat conducting contact with heat sink ring 11. At the point in the revolution of the turret whereat the sealing of the overlapped plies of plastic is to be done (the "sealing cycle"), the cams extend the holders such that the sealing bar 13 presses against the overlapped regions of the plastic. While the holders 12 are retracted, the seal bars absorb heat from the heat sink 11 to maintain operating temperature. The front face or nose 14 of the seal bar 13 achieves this elevated temperature and engages the overlapped plastic plies. After the sealing is complete, in relation to a time-movement function of the turret, the holder 12 retracts the seal bar 13, again seating it in heat exchange relation with the heater means 11.

Seal bar 13 is received in the channel 15 on the front of holder 12 and fastened at the back side of bar 13 by the series of screws 16 (shown in dotted outline). Holder 12 is connected to an arm slidable in turret 10 for moving the seal bar between inwardly retracted position, such as shown opposite the mandrel 17, and the outwardly extended position engaging the wrapped sheet material 18 on the mandrel 19. The nose of seal bar 13 engages the overlapped plies of material 18 and heat seals them one to the other.

Mandrels, such as 17 and 19, are each similar devices and comprise a cylindrical surface rotatably held on a center shaft 20. The mandrels attach the forward end of a blank shape (usually rectangular) of the material and the shaft 20 thereof is driven in a controlled manner to wrap the blank around the cylinder and overlap the opposite ends of the material into a two-ply relationship. As the mandrels wind the blank, the blank is retained and wrapped with the mandel by the arcuately extending guides 31. The winding cycle of each mandrel is terminated so that the two plies are substantially centered opposite the nose surface 14 (see mandrel 17 on FIG. 1).

In step with the rotation of turret 10 is an overhead conveyor (not shown) driven in a path which coincides with the path of the centers (shafts 20) of the mandrels. The conveyor is equipped with bottle chucks 21 which are closed about the mouth and finish of a glass bottle 22 supporting it in vertical, upright attitude for movement by the conveyor. Chucks 22 are spaced a distance equal to the center-to-center spacing of the mandrels (spacing of shafts 20) and the movement of the chucks and mandrels is synchronized. After the wound blank has its ends overlapped and sealed by the seal bar 13, a side-seamed sleeve of the material 18 is carried on the mandrel aligned with the bottle into an ejection cycle portion of the turret's rotation; whereupon, a stripper ring 23 carried in encircling fashion at the lower end of the mandrel is raised by a cam-operated arm 24. This ejects the sleeve from the mandrel by axially moving it upwardly and over the body of bottle 22. As the sleeve of the material 18 is shifted over the bottle, it slides, at one point on its periphery, between the bottle wall surface and a leaf spring 25 held on a bracket 26 on the turret. The tension of the spring 25, which is slight, holds the sleeve in place on the bottle.

Figure 2:
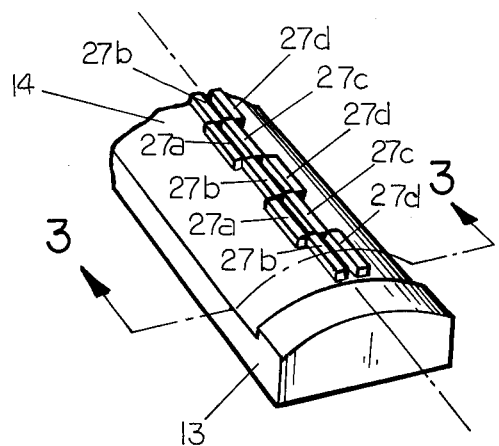
FIG. 2 is a partial, perspective view of the seal bar of the invention showing the raised projections on the nose of the bar.
Figure 3:
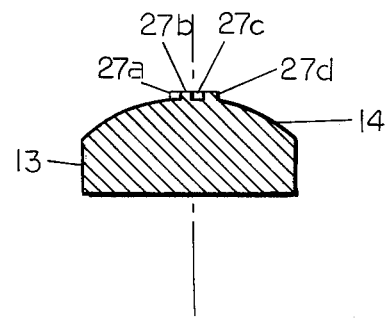
FIG. 3 is an end sectional elevational view of the seal bar taken along line 3—3 of FIG. 2.

Referring now to FIGS. 2 and 3, the improved seal bar 13 of the invention will be described. Seal bar 13 is made of metal having good heat transmission properties, such as aluminum, copper or stainless steel. The seal bar of the embodiment shown on FIGS. 2 and 3 is constructed with a series of offset raised bar-like islands 27 along the apex of the convex nose surface 14. The series of these projections 27 presents a zig-zag pattern such that as the bar presses against the overlapped material 18 on the mandrel, the heat transmitted to the material by direct contact of these hot projection islands 27 is intermittent and interrupted along the span of the sealed seam. Insofar as the material being sealed is concerned, it is engaged by this zig-zag effect of the repeating series of hot and relatively colder spots from the seal bar.

In the cross-section of seal bar 13 (FIG. 3), the island projections 27 in their longitudinal alignment on nose 14 lie in plural alignments, such as the four islands 27a through 27d seen on the drawing. As shown, there are four longitudinal rows of islands, the second and fourth rows having placement of the islands therein staggered from the island placement in the first and third rows. This staggering arrangement allows for a desirable ratio of hot to colder regions in the active face of the seal bar engaging material 18. There is a space or separation between each of the raised islands 27 and another of the same; however, three islands 27 along the nose surface 14 of the seal bar are close together.

Figure 4:
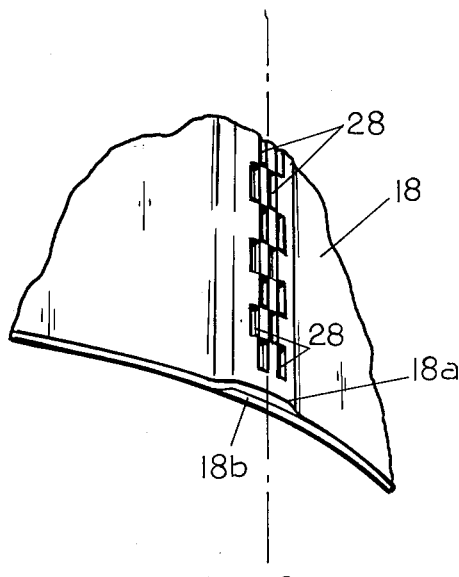
FIG. 4 is a partial, perspective view of the seam produced joining overlapped plies of the polymeric material utilizing the seal bar of the invention in a sealing apparatus.

The seamed sleeve article produced using the apparatus just described is shown, in part, on FIG. 4. The sleeve 18 is a hollow, side seamed, generally cylindrical piece of heat shrinkable thermoplastic polymeric material in which the circumferential dimension of the sleeve has a major orientation (stretch) compared to any orientation along the transverse dimension. Usually, in foamed polystyrene material (18) that is of average thickness of 0.015 inches, the ratio of the orientation (circumferential vs. axial) is about 5 or 6 to 1 in the sleeve, but may vary from 2 to 1 or slightly less to values higher, say 10 to 1. This is an important factor in the performance of the seam in the sleeve. The degree of orientation in the circumferential dimension is a factor of the heat shrinkage and degree of snug, conforming fit on the container. It is therefore of importance to assure good seams in the sleeves to achieve good efficiencies in production and quality of the product in its performance.

In practice, sleeves are made from a variety of thermoplastic polymers which may take the form of solid (non-cellular) sheet, foamed (cellular) sheet or a composite of the two in which a solid film is in a lamina relationship with a foam sheet.

As shown on FIG. 4, the sleeve 18, regardless of the polymer form of material, has its marginal end portion 18a overlapped (overlying) the opposite end portion 18b lying along the dimension of major orientation in the material. The seam is formed in this overlapped area (18a–18b) by the heat and pressure applied by the seal bar, which application according to the structure of seal bar 13 of FIGS. 2 and 3, produces the compressed, indented regions 28 in the material. The depressed/compressed areas 28 are fused zones or spot welded areas of the polymer in the 18a/18b sheet portions securing the overlapped material together as the side seam for the thermoplastic heat shrinkable sleeve.

Figure 5:
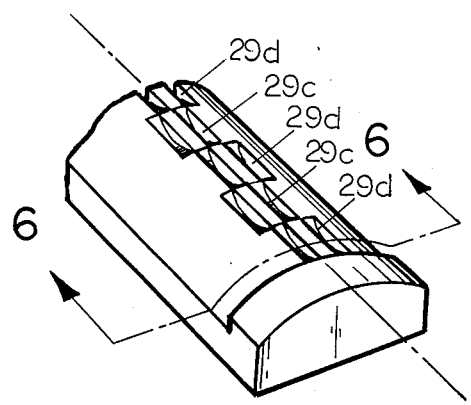
FIG. 5 is a partial, perspective view of the seal bar of a second embodiment.
Figure 6:
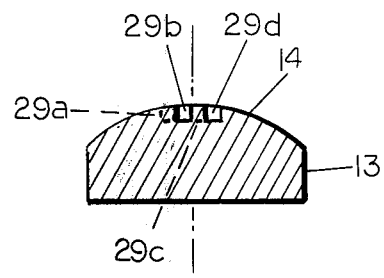
FIG. 6 is an end sectional elevational view taken along line 6—6 on FIG. 5.
Figure 7:
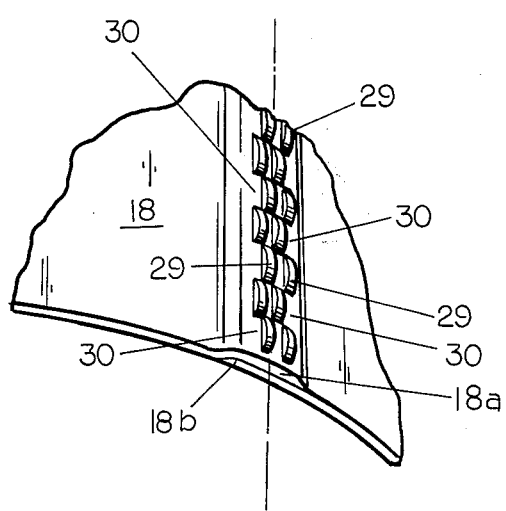
FIG. 7 is a partial, perspective view of the seam produced joining overlapped plies of the polymeric material in the second embodiment of the invention.

A second embodiment of the invention is shown in FIGS. 5–7. The seal bar 13 is in this form of the invention provided with indentations formed as relatively narrow, elongated pockets or depressions 29 disposed longitudinally along its nose surface 14. The indentations 29 may be milled in the metal of face 14 along the apex region of this convex surface. The distribution of the pockets is similar to the islands 27 of the first embodiment, described earlier. As shown in cross-section on FIG. 6, the pockets 29 line up in plural longitudinal rows or alignment of pockets 29a–29d. There is a slight space between each of the pockets disposed adjacent one another. The four alignments of 29a–d are such that the pockets are staggered through the length of the seal bar.

As shown on FIG. 7, the seal bar of this embodiment produces a seam in the overlapped opposite marginal end portions 18a and 18b of the blank of material which comprises a generally welded area 30 on the one layer 18a with the other layer 18b surrounding the raised plastic formations 29 which correspond in mirror image fashion with the pockets 29a–29d in the seal bar 13. The raised islands of plastic are created in the application of heat and pressure by seal bar 13 in making the side seam of the sleeve 18. The heat and pressure of the seal bar against the firm backing of mandrel 17 causes the material in and very near the pockets 29a–d of the seal bar to remain uncompressed or compressed very slightly and in a sense is a cold working area of the material; whereas, the area in the region 30 surrounding the raised island formations 29 is heat sealed and hot worked in a sense to assist filling the pockets on the seal bar. The pocket areas serve as a chill zone to avoid running the seal bar at too high a temperature to destroy or affect the plastic composition undergoing the heat seal or weld in the seam formation.

Either embodiment illustrated herein permits a wider temperature variation along the seal bar and, accordingly, the production process is less sensitive to the range of operating temperatures. Seams partly burned through are virtually eliminated in production. By incorporating the principles of the invention in changing the surface characteristics of the seal bar from a sealing strip of uniform temperature to a series of hot and relatively colder spots, the seam in the end-lapped blank can be made better and over a wider temperature range. Another benefit is derived in that more uniform heat seals in plastic sheet are made over wide variations of heat and/or pressure by interruption of the heat seal surface.

As used herein, the term "island" or "islands" is intended to mean a discrete area on the front facing surface of the seal bear which is displaced from the plane of said surface, i.e., either raised or depressed therefrom. Correspondingly, the same term is intended to describe a raised or depressed discrete area of the sealed side seam on a sleeve.

Other and further modifications may be resorted to without departing from the spirit and scope of the appended claims.

I claim:

1. A shrunken sleeve member for encircling a container comprised of a rectilinear sheet of a thermoplastic, cellular, heat shrinkable polymeric material, the opposite end margins thereof being overlapped and fusion bonded together by heat and pressure along a side seam region of said sleeve, said side seam having compressed areas of the overlapped material and plural, discrete island-like raised portions therein which are heated and compressed to a lesser degree than the balance of said overlapped areas of said side seam, the improvement therein comprising narrow, elongated, island-like, raised portions disposed in the seam area of the sleeve in at least four aligned rows thereof extending longitudinally of the sleeve side seam, said raised portions of material in each of the rows being hot worked in the sealing of the seam and offset from raised portions in the adjacent row thereof.

2. The sleeve member of claim 1 in which the thermoplastic cellular polymeric material comprises a foamed polyethylene layer and a film lamina thereon.

* * * * *